Jan. 18, 1966   S. K. GRINNELL ETAL   3,230,381
ELECTRIC POWER UNIT
Filed Feb. 24, 1964   2 Sheets-Sheet 1

INVENTORS
SHERMAN K. GRINNELL
ROBERT W. MANN
BY Claude Funkhouser
ATTORNEY

United States Patent Office 3,230,381
Patented Jan. 18, 1966

3,230,381
ELECTRIC POWER UNIT
Sherman K. Grinnell, Mayfield Heights, Ohio, and Robert W. Mann, Lexington, Mass., assignors, by mesne assignments, to the United States of America as represented by the Secretary of the Navy
Filed Feb. 24, 1964, Ser. No. 347,100
2 Claims. (Cl. 290—4)

The present invention relates to an electric power unit and more particularly to an electric power unit for use in guided missiles and the like.

This application is a continuation-in-part of Serial No. 855,243, now abandoned, filed November 24, 1959, for electric power unit.

In guided missiles, the phase prior to launch during which power is required by the missile may be several hours, while that requirement during the powered flight phase may be as little as a few seconds. In many missiles launched from a parent aircraft, it has been customary to supply the pre-launch power and the flight phase power from a unit internal to the missile. Since the power required in both phases of operation is approximately the same for equal time intervals, the total power requirement prior to launch far exceeds the total power required for the relatively short powered flight phase. It is advantageous to supply the power prior to launch from a source exterior to the missile because of the size and weight inherent in equipment necessary for such long-term power requirements. The present invention provides a small, light-weight, reliable and compact power unit for a guided missile, which unit is used during the powered flight phase only; an exterior source of power used during the pre-launch phase of operation.

In the prior art devices, power had been provided from power cells within the missile which have greatly added to the size and weight of the missile. The electrolyte has had to be placed in the cells hours before use making pre-launch maintenance a difficult task. The present invention uitilizes a rotary power unit having a solid fuel energy source, a partial admission turbine as prime mover, an induction motor alternator, permanent magnet alternator, a transformer rectifier unit and an eddy current control brake; thus obviating the need for heavy unreliable battery units which require special maintenance.

In the present invention, during the pre-launch phase, the motor alternator operates as a motor rotating at approximately the speed of operation during the powered flight phase when it is used as an alternator. Any speed changes which may result when the change-over is accomplished are damped by the eddy current brake, thereby minimizing the transient effect when switching from external to internal power sources.

An object of the present invention is the provision of an electric power unit for use in guided missiles and the like.

A further object is the provision of an electric power unit for missiles where an external source of power is used prior to launch and the transition to an internal source is made without appreciable effects from transients.

Yet another object of the present invention is the provision of an electric power unit that obviates the need for special maintenance prior to launch.

Other objects and many of the advantages of the present invention will be appreciated as the same becomes better understood by reference to the following detailed description of an embodiment of the invention considered in conjunction with the several figures of drawings in which like reference numerals designate like parts and herein:

Figure 1:
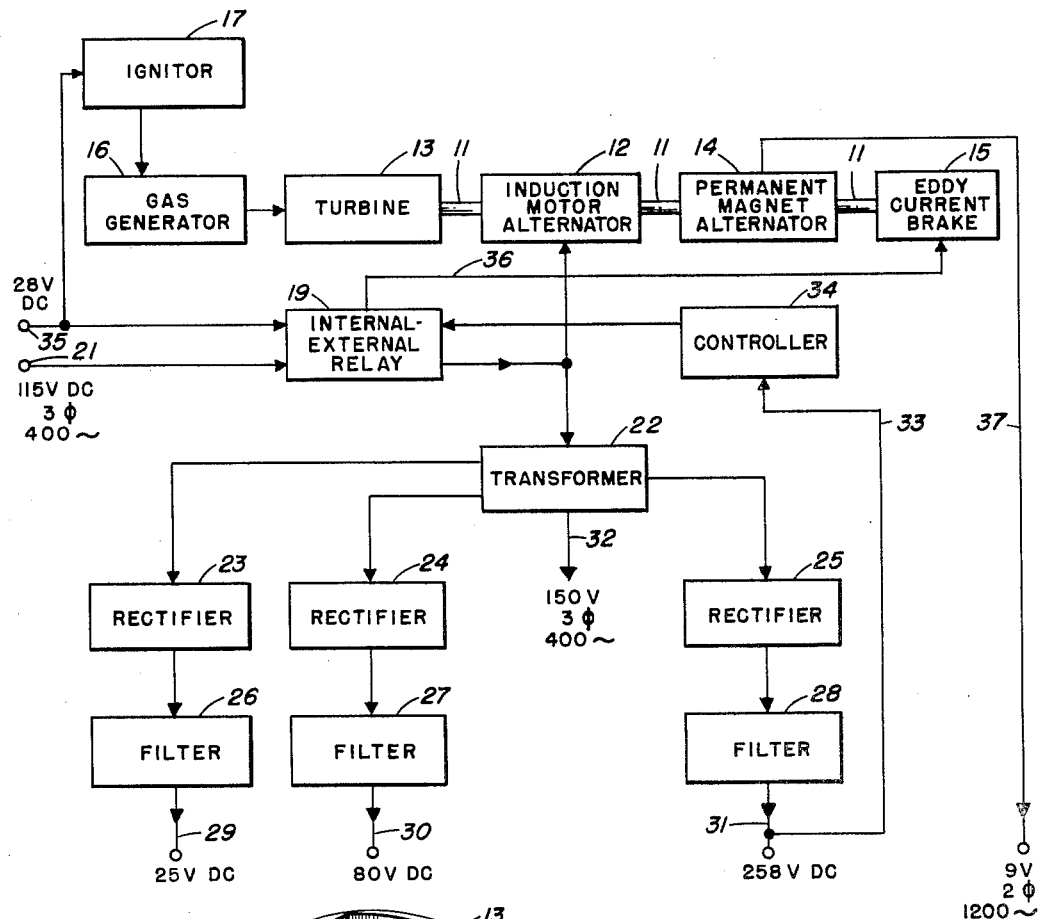
FIG. 1 is a functional block diagram of the present invention.

Referring now to the drawings wherein like reference characters designate like parts throughout the figures, there is shown in FIG. 1 a single rotating shaft 11 upon which an induction motor alternator 12, a turbine 13, a permanent magnet alternator 14 and an eddy current brake 15 rotate. The turbine 13 is fed by a gas generator 16 which is ignited by ignitor 17. The induction motor alternator 12 is fed from a source of alternating current (not shown) on input lead 21 through relay 19. Power from motor alternator 12 or the source, dependent upon the position of relay 19, is fed through a transformer 22 to rectifiers 23, 24 and 25 and associated filters 26, 27 and 28 resulting in D.C. power. Additionally, A.C. power is supplied from the transformer on lead 31 and from the permanent magnet alternator 14 on lead 32. A portion of the power from filter 28 is fed back over lead 33 to a controlled amplifier or a controller 34 through the relay 19 to the eddy current brake 15. Lead 35 is connected to ignitor 17 and relay 19 over which a signal voltage appears.

In the pre-launching phase, a source of alternating current, for example, 115 v., 3 phase, 400 c.p.s., is applied on input lead 21 to the induction motor alternator 12 and to the transformer 22 through relay 19. This power causes the motor alternator to act as a motor driving shaft 11, turbine 13, magnetic alternator 14 and eddy current brake 15 at a speed approximating the normal operating speed of the alternator 12. Power applied to the transformer 22 is rectified by rectifiers 23 through 25 and filtered by filters 26 to 28; appearing to the missile as direct current power. Typical examples of the voltages appearing on leads 29, 30 and 31 are 25, 80 and 158 volts, respectively. Lead 32 from transformer 22 provides an alternating current to the missile; typically, 150 v., single phase, 400 cycles. An additional alternating current is supplied to the missile by permanent magnet alternator 14; typically, 9 v., 2 phase and 1200 cycles.

Just prior to launch, an external signal is received by the power unit over lead 35 which ignites the fuel in gas generator 16 by action of ignitor 17. The gas created by this ignition drives partial-admission turbine 13 causing rotation of shaft 11 which in turn causes the motor alternator 12 to function as an alternator thereby supplying power to transformer 22 similar to that provided by the external source. Shortly after the turbine is operating at normal rotational speed, the external source of power is cut-off by action of relay 19 energized by another signal appearing on lead 35. At the same time, a path 33 from the output of filter 28 to the controller 34, lead 36 from the controller to the eddy current brake 15, is completed by the energization of the relay. The eddy current brake damps over a number of cycles, any transients that may appear due to changes in speed of the motor alternator. Such speed changes are due to the switch-over from external to internal power plants. Brake 15 further functions as a brake, controlling the speed of rotation of the shaft 11.

Figure 2:
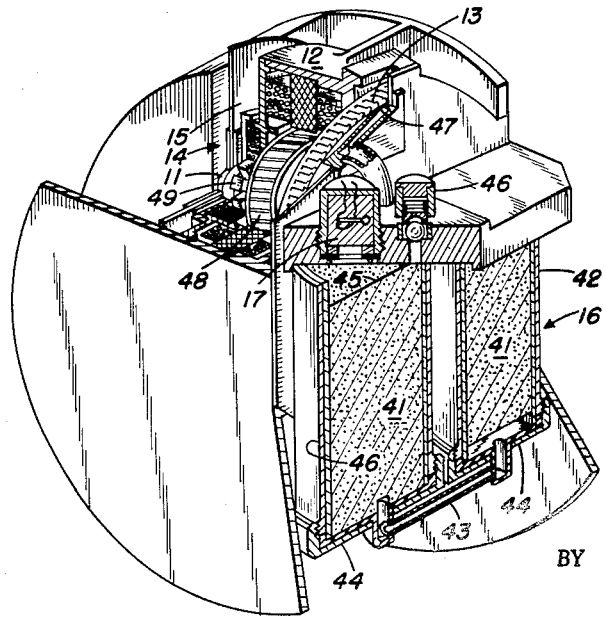
FIG. 2 is a sectional view of the power unit assembly.

FIG. 2 illustrates the generator and flow of the combustion products of the solid fuel in relation to the gas turbine. A pair of cylindrical solid-fuel grains 41, inhibited to burn in cigarette fashion, are located in parallel tubular pressure vessel 42 and are connected by a small tube 43 that joins the end cover cap 44 of the vessel 42. To initiate burning, the ignitor 17 sprays hot particles onto the face of the fuel at 45. Pressure-relief valve 46 is provided to reduce the peak ignition pressure. The generated gas flows from the combustion chamber through nozzle 47 to drive turbine 13. Rotor 48 of induction motor alternator 12 and rotor 49 of permanent-magnet alternator 14 are mounted with turbine 13 and brake disk 15 on a single shaft 11. The absence of any gearing, that is, the use of a single shaft, greatly improves the reliability of the device.

Figure 3:
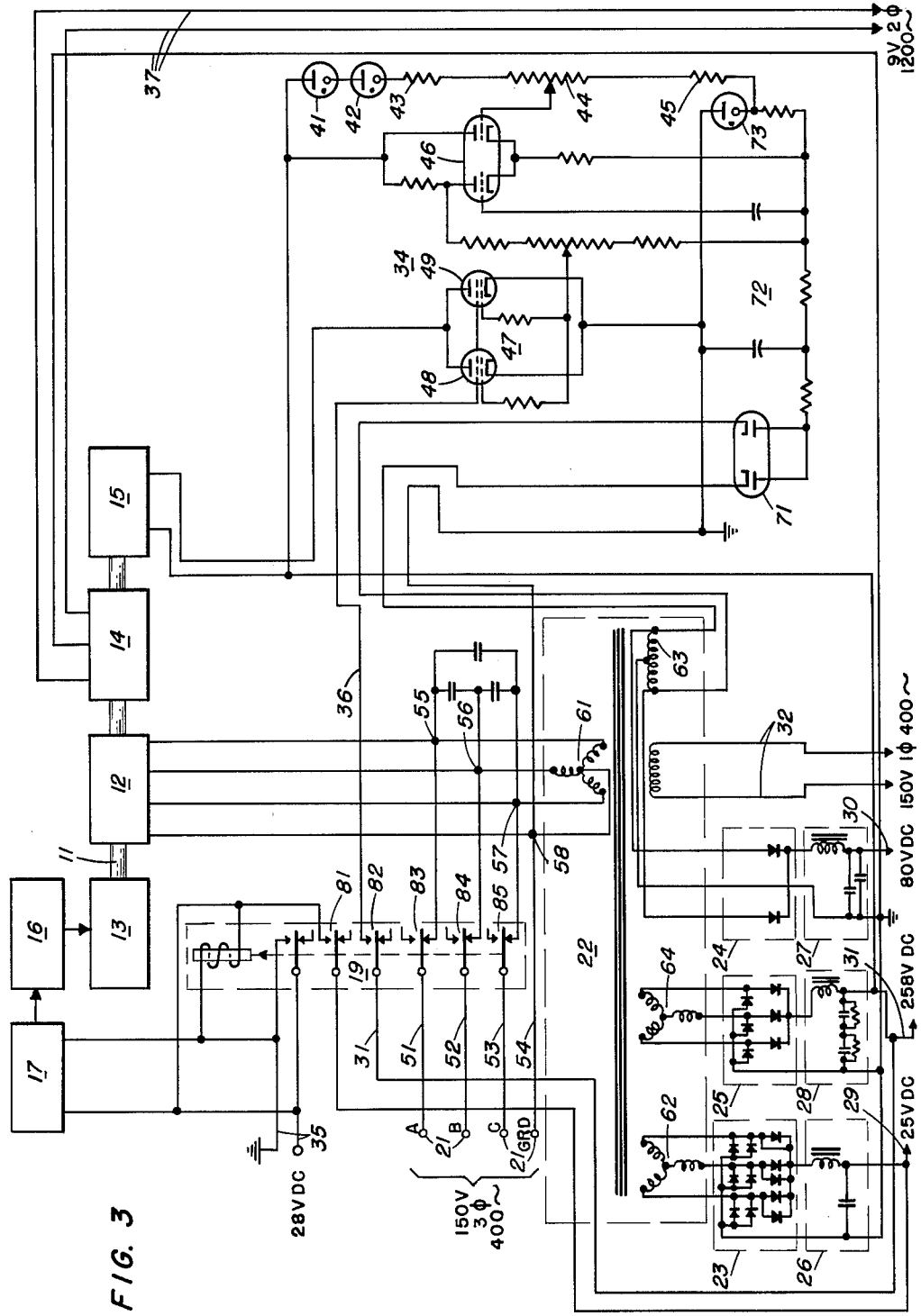
FIG. 3 is a schematic circuit diagram of the embodiment of FIG. 2.

Referring now to the schematic drawing of FIG. 3 for a more detailed description of the operation, there is shown terminals 10 from which the external source of A.C. power is applied. Leads 51 through 54 carry the 3 phase power; lead 54 being ground. Leads 51 through 53 are connected to movable contacts on relay 19 which is shown in the unenergized position. These contacts complete a path from the aforementioned leads to junctions 55, 56 and 57. The ground lead 54 does not pass through the relay but goes directly to junction 58. From junctions 55 through 58, power is applied to induction motor alternator 12 and to the primary winding 61 of 3 phase transformer 22. A three phase machine is used for compatability with the external source and to simplify rectification and filtering problems. As mentioned hereinbefore, this power causes motor alternator 12 to rotate acting as a motor turning shaft 11 and thereby rotating turbine 13, permanent magnet alternator 14 and eddy current brake 15. The alternator 14 generates a dual phase alternating voltage which is fed to the missile via lead 37.

The secondary windings 62 through 66 of transformer 22 feed power to the missile. The power from windings 62, 63 and 64 is rectified by the arrangement of semiconductor diodes from rectifier circuits 23, 24 and 25 in a conventional manner. This rectifier power is filtered by networks 26, 27 and 28 and thereafter supplied to the missile. Prior to launch, a signal from the parent aircraft over line 35 to ignitor 17 ignites the fuel in gas generator 16 causing rotation of turbine 13, rotating element 12 which now acts as an alternator supplying 3 phase, 400 cycle voltage to the transformer primary 61. The signal also closes relay 19 which self-locks via contact set 81, disconnects the external power supply contact pairs 83 to 85 and closes the loop contact pair 82 from output lead 31 through control amplifier 34 to the eddy current brake 15 which controls the speed of rotating shaft 11 thereby controlling the output voltages.

Controller 34 is a voltage-sensitive amplifier that detects variations in the output voltage and delivers a current proportional to this variation to the coil of brake 15. The output of filter unit 28 is connected through contact pair 82 of relay 19 across a pair of series connected voltage reference tubes 41, 42. Also connected in series with voltage reference tubes 41 and 42 is a voltage divider network which consists of resistors 43, 44 and 45. The error voltage signal is taken from the movable tap of resistor 44 and amplified by dual triode amplifier 46. The error signal is further amplified in amplifier 47 which consists of two parallel connected pentodes 48 and 49. The output of control amplifier 34 is connected to coil of brake 15. Winding 63 of transformer 22, rectifier 71, and filter network 72 supply negative voltage for control amplifier 34. Voltage reference tube 73 is connected between ground and the output of filter network 72 to prevent variations in the negative voltage from adversely affecting the voltage-error-sensing and amplifying portion of controller 34. In operation, as the output voltage increases the magnetic field of coil of brake 15 increases eddy-currents to be induced into disk of the brake which causes a braking of the unit. The frequency and voltage of the output of the unit are therefore controlled regardless of the burning rate of the gas-producing propellant.

Thus, an electric power unit has been fully disclosed which is light-weight, rugged, compact and reliable; and provides a transient-free change-over from an external power source.

Obviously, many modifications and variations of the present invention are possible in the light of the above teachings. It is therefore to be understood that within the scope of the appended claims the invention may be practiced otherwise than as specifically described.

What is claimed is:
1. A power supply comprising;
   an induction motor alternator;
   a permanent magnet alternator;
   an eddy current brake;
   a partial admission turbine;
   a rigid shaft mechanically linking said motor alternator, said magnetic alternator, said eddy current brake, and said turbine;
   generating means for driving said turbine;
   transformer means connected to said motor alternator;
   N filter and rectifier means connected to said transformer means;
   control means connected to at least one of said N filter and rectifier means;
   switching means having a first and a second position for connecting a source of alternating power to said transformer and said motor alternator when in said first position causing said motor alternator to function as a motor, and when in said second position for disconnecting said source from said transformer and said motor alternator and connecting said control means to said eddy current brake;
   means for applying a signal to said generating means for energizing said generating means and for switching said switching means from said first to said second position whereby said motor alternator functions as an alternator and said control means sends signals to said brake thereby controlling the speed of said turbine.

2. The apparatus of claim 1 wherein said transformer means further comprises;
   a single primary winding operatively connected to said motor alternator;
   a plurality of secondary windings at least N of which are operatively connected to said filter and rectifier means, the other of which provide output means for said power supply.

No references cited.

ORIS L. RADER, *Primary Examiner.*

G. SIMMONS, *Assistant Examiner.*